United States Patent [19]
Dolan et al.

[11] Patent Number: 5,594,162
[45] Date of Patent: Jan. 14, 1997

[54] VALVE STEM GAS LEAK DETECTOR

[76] Inventors: James P. Dolan; Patrick M. Dolan; James T. Dolan; Margaret R. Dolan, all of 4119 NE. 96th St., Seattle, Wash. 98115

[21] Appl. No.: 465,819

[22] Filed: Jun. 6, 1995

[51] Int. Cl.[6] .................. F16L 55/168; G01W 1/11; F16K 41/04
[52] U.S. Cl. .................. 73/46; 73/40.5 R; 73/335.05; 324/691; 338/34
[58] Field of Search .................. 73/46, 40.5 R, 73/40, 335.05; 324/691, 34; 338/34

[56] References Cited

U.S. PATENT DOCUMENTS

| | | | |
|---|---|---|---|
| 3,045,198 | 7/1962 | Dolan et al. | 338/13 |
| 4,224,585 | 9/1980 | Dolan | 338/34 |
| 4,237,721 | 12/1980 | Dolan | 73/23 |
| 4,466,273 | 8/1984 | Pillette | 73/46 |
| 4,517,828 | 5/1985 | Miller et al. | 73/46 |
| 4,562,725 | 1/1986 | Oka et al. | 73/29 |
| 4,573,344 | 3/1986 | Ezekoye | 73/46 |
| 4,727,749 | 3/1988 | Miller et al. | 73/46 |
| 4,737,707 | 4/1988 | Mori et al. | 324/61 R |
| 4,915,816 | 4/1990 | Shakkottai et al. | 204/430 |
| 4,972,867 | 11/1990 | Ruesch | 137/15 |
| 5,028,906 | 7/1991 | Moriya et al. | 338/35 |
| 5,101,657 | 4/1992 | Lahlouh et al. | 73/40.5 R |
| 5,263,682 | 11/1993 | Covert et al. | 251/214 |
| 5,309,752 | 5/1994 | Beckinghausen, Jr. et al. | 73/40.7 |
| 5,348,044 | 9/1994 | Eugene et al. | 137/312 |
| 5,457,333 | 10/1995 | Fukui | 257/253 |

OTHER PUBLICATIONS

Information folder on Brady Leak Tracker System, by Brady, Inc. of Milwaukee, WI, 1994.
Xomox Corporation information folder on Testing Valves for Emission Control, by Xomox Corporation of Cincinnati, OH, undated.
Information booklet on the Testo 350 Emissions Analyzer, by Testo Inc. of Flanders, NJ, undated.
Information booklet on the Century OVA 108 Portable Organic Vapor Analyzer, by The Foxboro Company, 1985.

*Primary Examiner*—Hezron E. Williams
*Assistant Examiner*—J. David Wiggins

[57] ABSTRACT

A valve stem gas leak sensor or detector configured to surround a possibly leaking petrochemical or like flow line valve stem and provide for external monitoring equipment an electrical resistance related to the amount of hydrocarbon gas leakage occurring around the valve stem. Such a gas leak detector, termable a ring sensor, is configured as a stem surrounding enclosure, with interconnecting segments for ease of installation around and removability from a valve stem, with one or both of each such segments having an interiorly arranged layer of gas sensor particulate material characterized by change in electrical resistance in the presence of a changing concentration of hydrocarbon gas leakage around a valve stem, and with interengaging connector/conductor pins holding the segments together around the valve stem and across which the electrical resistance of one or both gas sensor material layers can be measured with the ring sensor in place on the valve stem.

11 Claims, 4 Drawing Sheets

5,594,162

VALVE STEM GAS LEAK DETECTOR

BACKGROUND OF THE INVENTION

1. Field of the Invention

This invention relates to hydrocarbon gas sensors and more particularly to such gas sensors designed to monitor the presence of hydrocarbon gas and in particular hydrocarbon gas leakage from the valve stem of a valve in a gas flow line such as found in petrochemical and petroleum refineries and the like.

2. Background of the Invention

There is need as a matter of storage efficiency and environmental protection for valving as used in petroleum and petrochemical lines and the like to have incorporated therewith sensing mechanism by which leakage of gas from the valving can be monitored on a continuing basis so that gas leakage is promptly detectable when it occurs and can be corrected.

Sensors and sensor materials responsive to the presence of even minute amounts of hydrocarbon gases are known such as disclosed in Dolan U.S. Pat. Nos. 3,045,198, 4,224,595 and 4,237,721, for example. Such gas sensors in general are comprised of electrically conductive adsorbent particles embedded in a resilient supporting substrate and are typically in cylindrical form such as shown in FIG. 4 of U.S. Pat. No. 3,045,198. Typically, in such sensors, the substrate is comprised of a resilient material such as rubber or silicone and the electroconductive particles are selected from the group consisting of platinum, platinum black, aluminum, silver, gold, tantalum, carbon, or any other well-known electrically conductive particles and can comprise particles of various sizes and mixtures of such particles. However, as presently known, such gas sensors are difficult and inefficient to use to detect hydrocarbon gas leakage in the vicinity of the stem of a petrochemical or like valve because a conventional sensor, in present form at least, even when placed next to a valve stem, is adjacent to only a small portion of the valve stem surface and exposed to only a small portion of the escaping gas if such gas is present.

SUMMARY OF THE INVENTION

It is an object and feature of the present invention to provide an efficient gas leak detector, for use in conjunction with petrochemical and petroleum refinery flow line valves and the like, which comprises a generally cylindrical enclosure surrounding the stem of a valve being monitored for escaping gas, which can be readily installed and removed from the valve stem, which is non-powered, which is economical to manufacture and is durable during use, which can be programmed on an individualized basis for ready identification in connection with any gas leakage around the given valve stem with which it is so identified, and which can be fabricated to respond sensitively to a variety of hydrocarbon gases.

These and other objects, features and advantages of valve stem gas leak detectors according to the present invention will be apparent from the following description and accompanying illustration of a typical embodiment thereof.

DESCRIPTION OF THE PREFERRED EMBODIMENT

Figure 1:
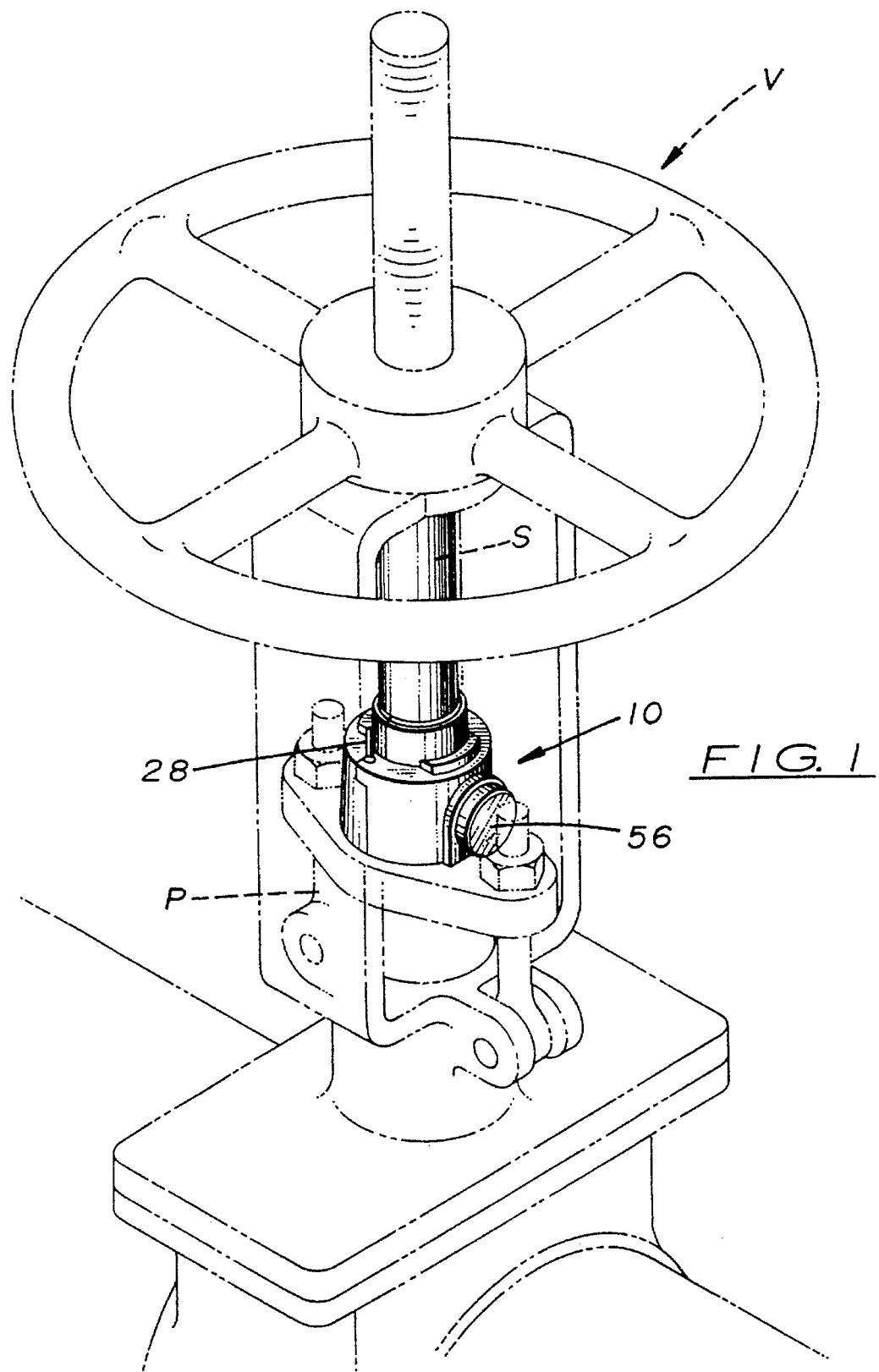
FIG. 1 is an isometric view of a petrochemical valve and a portion of the associated lineage, shown in phantom, with a gas leak detector according to the present invention installed around the stem of the valve.

FIG. 1 shows a typical conventional gas flow line valve, generally designated V, as used in petrochemical and petroleum refinery flow systems, for example. The valve V as shown comprises a valve stem S around which there is a packing gland P which, in such valves, through wear and the like, can become worn and permit substantial leakage of hydrocarbon gas contained in the system to occur around the stem S. To monitor the valve V for gas leakage around the stem S, the present invention in the embodiment illustrated provides a gas sensor generally indicated at 10 which is placed around the valve stem S above the packing gland P and forms a ring-like generally cylindrical enclosure around the valve stem as shown in FIG. 1, closely surrounding the stem S immediately above the packing gland P. The gas sensor 10 contains one or more layers of gas sensing materials the valve stem S, the interior surface of the generally cylindrical enclosure, and is what may also be termed a ring sensor, with externally placed electrical conductors or contacts engageable by external resistance measuring equipment (not shown) for monitoring the electrical resistance of said one or more gas sensing materials.

Figure 2:
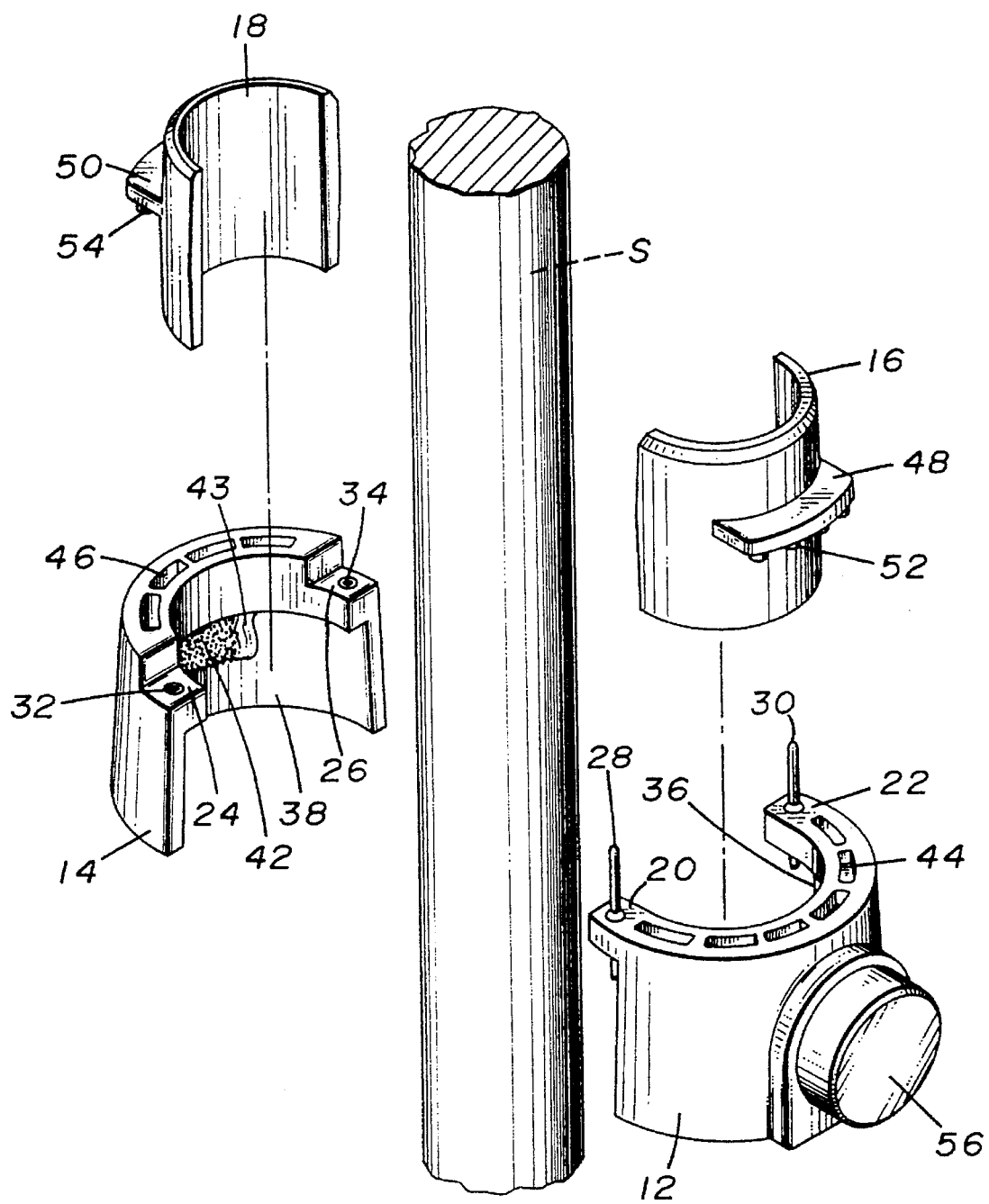
FIG. 2 is an exploded view on an enlarged scale of an isometric showing of a valve stem portion with sensor segments and shield segments shown in exploded form to illustrate the specific constructional nature thereof and the manner of assembly with reference to a valve stem.
Figure 3:
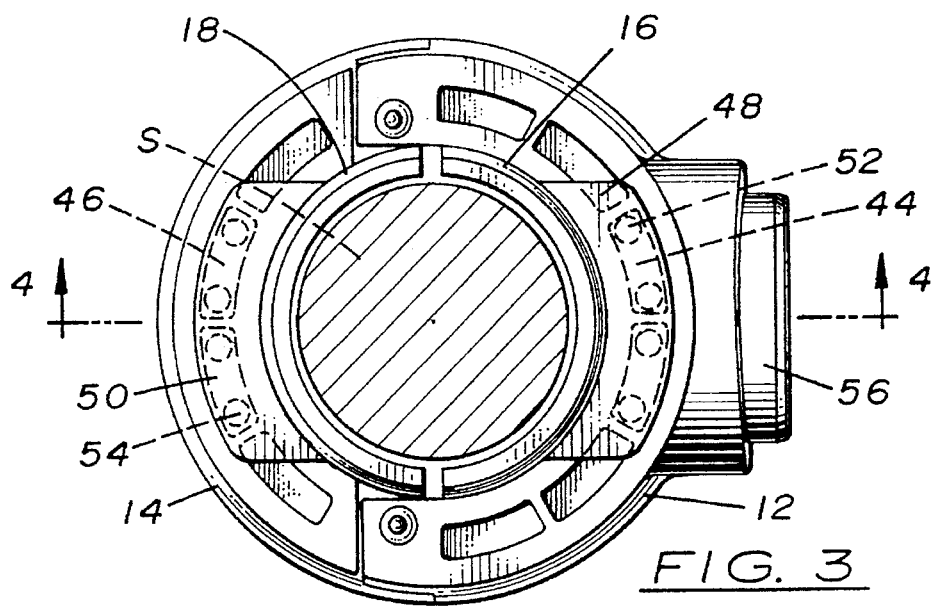
FIG. 3 is a top plan view on a further enlarged scale of the gas sensor segments and shield segments according to the present invention, shown in an assembled condition with respect to the valve stem, with the stem shown in phantom in lateral cross-sections.
Figure 4:
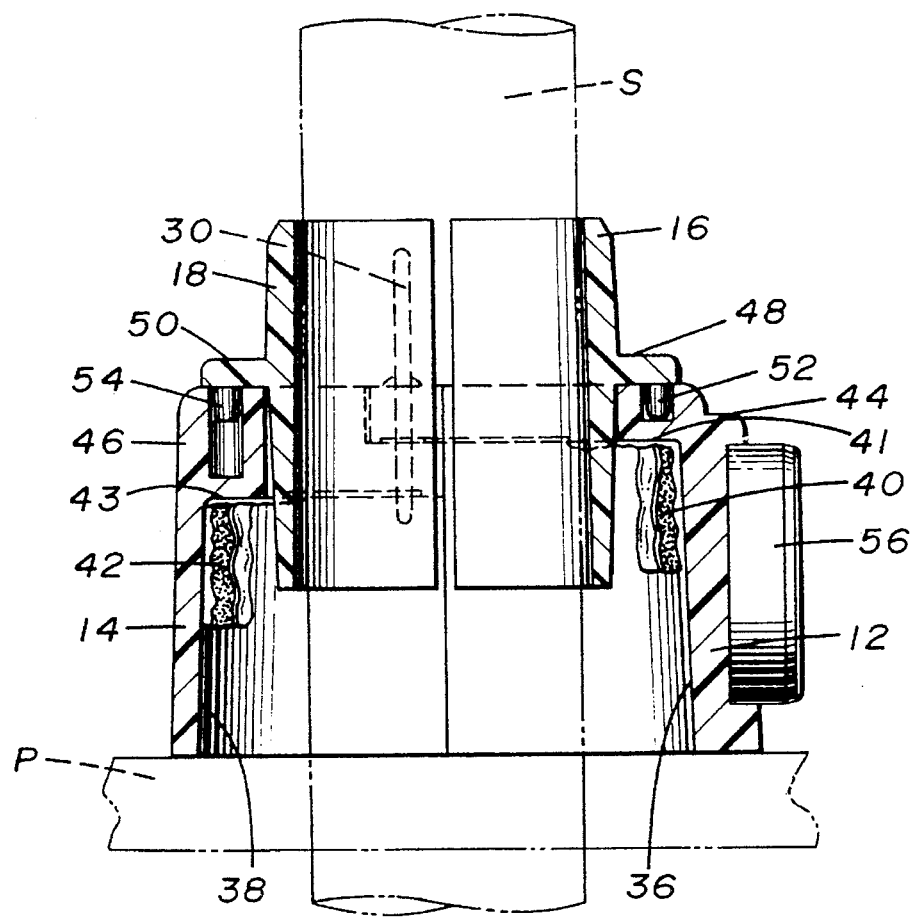
FIG. 4 is a view in axial cross section of the sensor segments and shield segments shown in FIG. 3, taken substantially along line 4—4 thereof.

FIG. 2 discloses the gas sensor 10 shown in FIG. 1 in an exploded view with its gas sensor segments and shield segments separated radially from a valve stem S and separated axially with respect to each other. Specifically, gas sensor segments 12, 14 are shown in axial relation with respect to respective shield segments 16, 18. Each of the sensor segments 12, 14 is generally semi-cylindrical in configuration with segment 12 having circumferentially extending portions 20, 22 which circumferentially overlap similar circumferentially extending portions 24, 26 of segment 14 when the two are assembled together (FIGS. 3 and 4). The segments 12, 14 when so assembled are held together by the lower ends of steel connector/conductor pins 28, 30 which are positioned in respective jacks or sleeves 32, 34 in segment 14.

Figure 5:
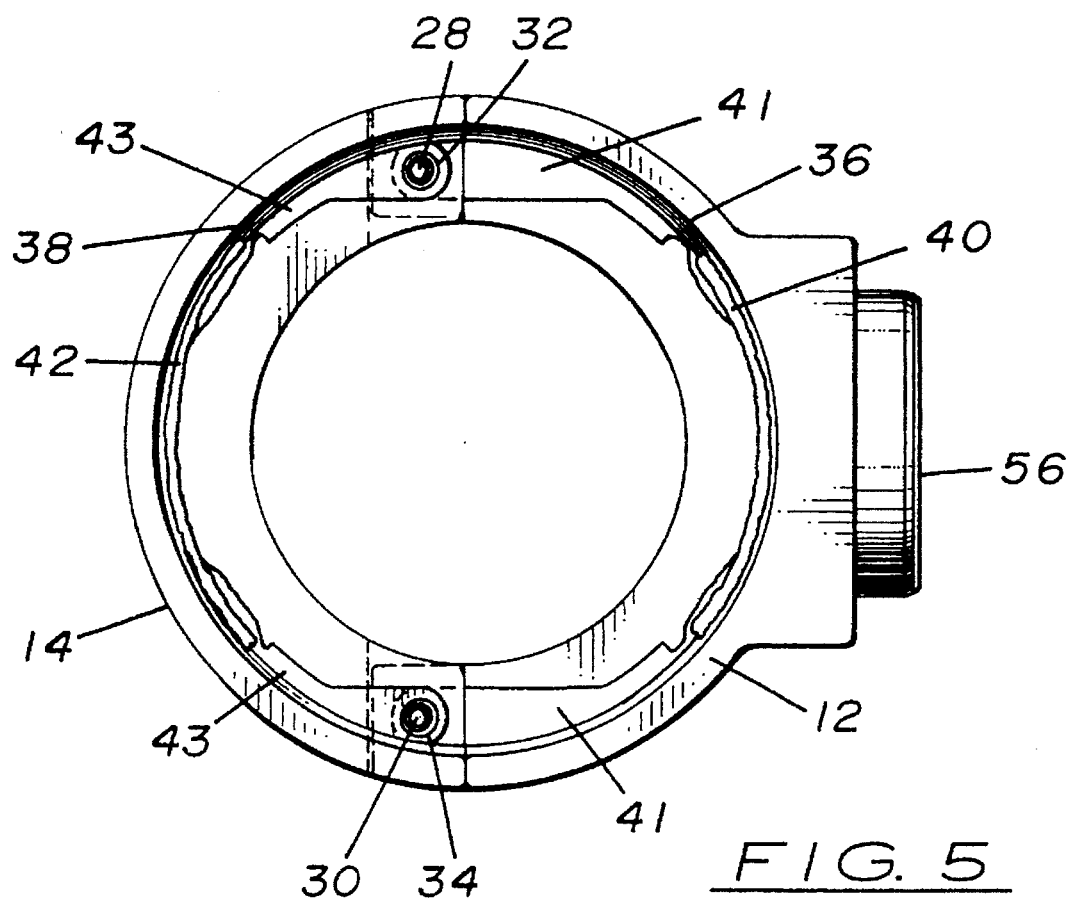
FIG. 5 is a bottom view taken in lateral cross-section of the sensor segments with the shield segments removed for clarity of showing of the nature of the sensor surfaces.

One or both of the respective inner surfaces 36, 38 have an electrically conductive gas sensor material layer 40, 42 coated thereon, such as disclosed in Dolan U.S. Pat. No. 4,224,595, for example, which material layer 40, 42 is responsive to the presence of even minute amounts of hydrocarbon gases and which layers 40, 42 may be comprised of either the same material or of different gas sensor materials. If different materials, as will be recognized, one material layer 40 or 42 can be responsive to a different order of hydrocarbon gas concentration or a different type of hydrocarbon gas than the other, if desired. To provide a measurable output from the one or both gas sensor material layers 40, 42, the material layer 40 is in electrical conductive relationship with and has electrical continuity with the connector pins 28, 30 by means of silver paint 41 and the material layer 42 is in electrically conductive relationship with the metallic jacks or sleeves 32, 34 by means of silver paint 43 (FIGS. 4 and 5).

As will be apparent, the electroconductive layers 40, 42 are electrically connected in parallel across the pins 28, 30 and these pins are externally exposed when the segments 12, 14 are in assembled condition around a valve stem S (FIGS. 1 and 3) so as to be engageable by resistance measuring equipment for monitoring the resistance of said one or more gas sensor materials and consequently a gas leakage condition around the valve stem S if such leakage is occurring.

As a specific example of advantageous use of different gas sensor materials in the respective layers 40, 42 on the interior surfaces 36, 38 of the enclosure formed by the semi-cylindrical segments 12, 14, and utilizing graphite particles in one layer 40 and silver particles in the other layer 42 in a gas sensor designed for detection of naptha gas, the nominal resistance of the respective layers 40, 42 in the absence of naptha gas (0 parts per 1,000,000) is respectively about 700 ohms and about 2 ohms, which will give a resistance reading of 2 ohms at the pins 28, 30 because the layers 40, 42 are connected in parallel across the pins 28, 30. When successive readings are compared for a ring sensor utilizing a graphite particle layer 40 alone, versus a ring sensor utilizing a silver particle layer 42 in parallel with a graphite layer 40, the readings are 1400 ohms and 6 ohms for 200 parts per 1,000,000 naptha gas, 8500 ohms and 13 ohms for 400 parts per 1,000,000 naptha gas, 12,000 ohms and 200 ohms for 600 parts naptha gas per 1,000,000, 30,000 ohms and 1200 ohms for a naptha gas concentration of 800 parts per 1,000,000, 160,000 and 120,000 ohms for a naptha gas present in the amount of 1000 parts per 1,000,000, and 1 megohm and 1 megohm for naptha gas present in the an amount of 1200 parts per 1,000,000. By the use of the respectively different makeup in the gas sensor layers 40, 42 the range of sensitivity of the gas sensor is extended, specifically in the lower concentrations in this instance.

As earlier indicated, various sensor particle sizes and sensor particle mixtures according to the aforementioned Dolan patents and otherwise known in the art can be utilized in the one or more gas sensor material layers 40, 42 to adapt sensors according to the present invention to usages for monitoring a wide variety of hydrocarbon, i.e. organic, gases such as gasoline, diesel, naptha, ethers, keytones, halogenated hydrocarbons and the like.

The respective sensor segments 12, 14 have a relatively increased overall thickness in the upper portions thereof and are provided with respective series of holes, certain of which are indicated at 44, 46, so that the net wall thickness of the segments, considered cross-sectionally is approximately the same throughout. These segments are preferably fabricated of molded plastic, such as PVC, and the uniformity of wall thickness throughout facilitates the fabrication thereof.

To aid in the protection of the sensor material layers 40, 42 during handling of the sensor segments 12, 14, the form of gas sensor 10 illustrated includes substantially semi-cylindrical shield segments 16, 18 which have respective external, radially extending ledges 48, 50, each with respective downwardly and axially extending peg-like projections, certain of which are indicated at 52, 54 which fit within respective holes 44, 46 in the segments 12, 14 and snugly substantially surround the valve stem S. In practice, the respective shield segments 16, 18 are assembled with and bonded as by adhesive onto the respective sensor segments 12, 14 before assembly of the segments 12, 14 around the valve stem S. With such preassembly of a given shield segment on its associated sensor segment the shield segment in its lower portion extending axially and substantially coextensively with and in spaced relation to the associated sensor material layer and serves to mechanically protect the sensor material layer from physical contact by a worker installing the sensor and from contact with the valve stem or portions of the valve packing gland during assembly of the segments around the stem.

The shield segments also function as a grease guard to minimize possible fouling of the gas sensor layers with grease from the valve stem and valve packing gland.

When the sensor segments and associated shield segments are in assembled form around the valve stem S, the desired design parameter with respect to clearance of the shield segments around the stem is to leave the segments somewhat loose relative to the stem (with about 0.025 inch clearance) to prevent gas buildup within the sensor segments.

As will be reconginzed with respect to the sensor materials responsive to minute quantities of hydrocarbon gas in terms of change in electrical resistance across adsorptive particles, with a given type of material, for example a layer of carbon particles and with no hydrocarbon gas leak, the resistance of a given sensor material layer can be about 700 ohms. Then, if a leak occurs, such as on the order of 3 mm per minute of hydrocarbon vapor escape rate, the electrical resistance of the gas sensor material layer can increase to about 100,000 ohms, indicating of course that there is substantial valve leakage needing valve packing replacement or other valve repair.

As will be apparent, valve stem gas leak detectors according to the invention can be made in various sizes for use with various diameter valve stems and one advantage of fabrication with separate sensor segments (e.g. segments 10, 12) and shield segments (e.g. segments 16, 18) is that a given pair of gas sensor segments (e.g. 10, 12) can be used with a range of sizes of valve stems by providing an inventory of a plurality of sizes of shield segments (e.g. 16, 18) which are of course cheaper and simpler to fabricate than the gas sensor segments.

In use, gas sensor segments in ring form according to the present invention can be read with any ohmmeter in a one second response time, as by momentary connection of the meter probes to the connector/conductor pins (e.g. 28, 30) giving an instantaneous reading directly related to hydrocarbon gas concentration around the valve stem. Such ring sensors do not interfere with valve operation, require no valve disassembly, and are installable quickly and also quickly removable for other valve maintenance. The gas sensor technology involved is in widespread use for petroleum leak detection in hundreds of service stations and elsewhere, and is intrinsically safe. The ring sensor of the invention is projected as having a field life of ten years and more and is not affected by rain, humidity, wind, dust, temperature extremes, paint, or lubrication grease.

In the form of sensor segments shown, one of the segments 12 is provided with an RFID identifier 56, suitably of a type known per se such as an OF 12-Series Read Only Tag, readable by a Balogh Transceiver, and available from the Balogh Company of Ann Arbor, Mich., to provide electronic identification essentially simultaneously with a hydrocarbon gas concentration responsive resistance reading.

Alternatively, individual gas sensor and gas valve identification can be provided by installing with a given valve stem ring sensor a touch memory in electrically parallel relation to the gas sensor material, as by use of a touch memory such as Dallas semiconductor DS 2502 available from Dallas Semiconductor, Inc. of Dallas, Tex. Such a touch memory can be written to and read in a conventional manner to provide a means for individually identifying a particular valve stem and its sensor electronically. A blocking diode is placed in circuit in parallel arrangement with a given gas sensor material, (i.e. across pins 16, 18, for example). Then, with a positive bias applied across the material a monitor receives an identification input from the semiconductor. By reversing the bias across the semiconductor and the gas sensor material, the resistance of the gas sensor material can then be measured, the blocking diode in such second reading situation having a high impedance and serving to electrically remove the identifier semiconductor from the sensor measuring circuit.

From the foregoing further modifications and adaptations and changes can occur to those skilled in the art, consistent with the nature of the invention as defined in the following claims.

What is claimed is:

1. A valve stem gas leak sensor comprising a generally cylindrical enclosure closely surrounding the valve stem of a possibly leaking petroleum flow line valve, said cylindrical enclosure being situated adjacent the valve packing gland and being interiorly open around said valve stem, a hydrocarbon gas sensing material layer on the interior surface of said enclosure, and electrical conductor means electrically connected to said hydrocarbon gas sensing material with portions of said conductor means exposed exteriorly of said enclosure so as to be contactable by external monitoring equipment which, by sensing a change in the electrical resistance of said gas sensing material caused by adsorption of hydrocarbon gas into the sensing material layer, provides an indication of there being hydrocarbon gas present interiorly of said enclosure, said generally cylindrical enclosure comprising two substantially semi-cylindrical segments, each having mating surfaces designed to mate together in a complementary manner with metallic pins in one segment fitting in jacks in the other segment which are arranged to hold said segments together around the valve stem.

2. A valve stem gas leak sensor according to claim 1, wherein said metallic pins also serve as said conductor means.

3. A valve stem gas leak sensor according to claim 2, wherein substantially semi-cylindrical shield segment means are mounted around the valve stem such that said shield segment means are arranged interiorly of said enclosure segments, and also arranged in inwardly spaced relation with respect to said hydrocarbon gas sensing material layer.

4. A gas leak detector for use in conjunction with the valve stem of a valve in a petroleum flow line such as found in petrochemical and petroleum refineries and the like, said detector comprising:

two substantially semi-cylindrical segments, each segment having circumferentially extending portions overlapping similar portions on the other segment, said segments when assembled together in an overlapping manner having a inner bore of a diameter slightly larger than the diameter of the valve stem around which they are designed for mutual assembly on and said segments when so assembled having within one or more circumferentially recessed inner portions of said inner bore one or more deposits of gas sensor material layers the electrical resistance of which is responsive to and varied by the presence and adsorption of any hydrocarbon gas escaping at the valve stem on which the segments are assembled;

a pair of axially extending connector pins interconnecting said segments, said pins being in electrically conductive engagement with said one or more deposits of gas sensor materials and extending externally of the assembled segments so as to be engageable by resistance measuring equipment for monitoring the resistance of said one or more deposits of gas sensor materials and consequently indicating any gas leakage condition around the valve stem on which the segments are installed.

5. A gas leak detector according to claim 4, further comprising a pair of semi-cylindrical, thin-walled guards axially insertable between the stem of the valve on which said two substantially semi-circular segments are assembled and the inner bore of said segments, said guards in such position serving to protect the one or more sensor material layers within the segments from physical damage.

6. A valve stem gas leak sensor comprising an enclosure closely surrounding the valve stem of a possibly leaking petroleum flow line valve, said enclosure being situated adjacent the valve packing gland and being interiorly open around said valve stem, a hydrocarbon gas sensing material layer on the interior surface of said enclosure, and electrical conductor means electrically connected to said hydrocarbon gas sensing material with portions of said conductor means exposed exteriorly of said enclosure so as to be contactable by external monitoring equipment which, by sensing a change in the electrical resistance of said gas sensing material caused by absorption of hydrocarbon gas into the sensing material layer, provides an indication of there being hydrocarbon gas present interiorly of said enclosure, said enclosure comprising two separable segments having circumferentially extending portions overlapping similar portions on the other segment with said segments configured, when assembled together in an overlapping manner, to provide an inner bore of a diameter slightly larger than the diameter of the valve stem around which they are designed for mutual assembly.

7. A valve stem gas leak sensor according to claim 6, wherein said segments comprise mechanically interengageable parts which are assemblable and separable by relative movement axially of the valve stem, and which are configured to hold said segments together around the valve stem when interengaged.

8. A valve stem gas leak sensor according to claim 7, wherein said interengageable parts include are metallic pins in one segment and jacks in the other segment in which the pins interfit.

9. A valve stem gas leak sensor according to claim 6, comprising shield segments mounted around the valve stem and arranged interiorly of said enclosure segments in inwardly spaced relation with respect to said hydrocarbon gas sensing material layer.

10. A valve stem gas leak sensor according to claim 6, wherein said inner bore of said enclosure provides a somewhat loose spacing relative to the valve stem surrounded by the enclosure so as to prevent gas build-up within the enclosure.

11. A gas leak detector according to claim 10, wherein said spacing is about 0.025 inch.

* * * * *